US010442451B2

(12) United States Patent
Burns et al.

(10) Patent No.: US 10,442,451 B2
(45) Date of Patent: Oct. 15, 2019

(54) MOBILE CHILD SUPPORT DEVICE

(71) Applicant: KIDS II, INC., Atlanta, GA (US)

(72) Inventors: Stephen R. Burns, Cumming, GA (US); Jacob Sclare, Dacula, GA (US)

(73) Assignee: KIDS II, INC., Atlanta, GA (US)

(*) Notice: Subject to any disclaimer, the term of this patent is extended or adjusted under 35 U.S.C. 154(b) by 0 days.

(21) Appl. No.: 16/010,796

(22) Filed: Jun. 18, 2018

(65) Prior Publication Data
US 2018/0297623 A1 Oct. 18, 2018

Related U.S. Application Data

(63) Continuation of application No. 15/623,582, filed on Jun. 15, 2017, now Pat. No. 10,000,225, which is a continuation of application No. 15/077,075, filed on Mar. 22, 2016, now Pat. No. 9,701,331.

(60) Provisional application No. 62/141,106, filed on Mar. 31, 2015, provisional application No. 62/152,854, filed on Apr. 25, 2015.

(51) Int. Cl.
B62B 7/04 (2006.01)
A47D 13/10 (2006.01)
A63H 33/00 (2006.01)
B62B 9/20 (2006.01)

(52) U.S. Cl.
CPC .............. B62B 7/04 (2013.01); A47D 13/107 (2013.01); A63H 33/006 (2013.01); B62B 9/20 (2013.01)

(58) Field of Classification Search
CPC ........................................................ B62B 7/14
See application file for complete search history.

(56) References Cited

U.S. PATENT DOCUMENTS

| 1,631,889 | A | 8/1899 | Friedersdorff |
| 2,198,313 | A | 4/1940 | Hall |
| 2,665,742 | A | 1/1954 | Starysky |
| 2,765,839 | A | 10/1956 | Arpin |
| 3,145,048 | A | 8/1964 | Dowdy et al. |
| 4,045,045 | A | 8/1977 | Boucher et al. |
| 4,231,582 | A | 11/1980 | Moss |
| 4,359,242 | A | 11/1982 | Gerken et al. |
| 4,699,392 | A | 10/1987 | Ku |

(Continued)

FOREIGN PATENT DOCUMENTS

| FR | 2965465 A3 | 4/2012 |
| KR | 200196242 Y1 | 9/2000 |
| WO | 2011158059 A1 | 12/2011 |

OTHER PUBLICATIONS

Extended European Search Report for EP App. No. 16162929.0; dated Aug. 19, 2016; 7 pgs.

Primary Examiner — Hau V Phan
Assistant Examiner — James J Triggs
(74) Attorney, Agent, or Firm — Gardner Groff & Greenwald, PC

(57) ABSTRACT

A mobile child support and entertainment device includes a base panel having roller elements for rolling support along a support surface, an upper support body having a seat positioned generally centrally therein for receiving a child, and at least one support leg extending between the base panel and the upper support body. The device allows a caregiver to move the child in the device from location to location, and provides entertainment and activity for the child. Embodiments of the device are configured for ease of maneuverability and access.

20 Claims, 5 Drawing Sheets

(56) References Cited

U.S. PATENT DOCUMENTS

| | | |
|---|---|---|
| 4,799,700 A | 1/1989 | Knoedler et al. |
| 4,822,030 A | 4/1989 | Cone |
| 5,050,862 A | 9/1991 | Saghafi |
| 5,407,246 A * | 4/1995 | Meeker ................ A47D 13/102 248/372.1 |
| 5,441,289 A | 8/1995 | Spielberger |
| 5,813,681 A | 9/1998 | Saint et al. |
| 5,845,963 A | 12/1998 | Huang |
| 6,231,056 B1 | 5/2001 | Wu |
| 6,817,864 B1 | 11/2004 | Martinez |
| 6,863,287 B2 | 3/2005 | Myers et al. |
| 7,017,924 B1 | 3/2006 | Lambert |
| 7,025,364 B1 * | 4/2006 | Clarke ................... A47D 13/04 280/47.38 |
| 7,044,892 B2 | 5/2006 | Stern et al. |
| 7,287,768 B2 * | 10/2007 | Myers ..................... A47D 3/00 280/649 |
| 7,347,432 B2 | 3/2008 | Myers et al. |
| 7,819,410 B2 | 10/2010 | Myers et al. |
| 8,162,333 B1 | 4/2012 | Bartlett |
| 8,302,978 B2 | 11/2012 | You et al. |
| 9,701,331 B2 | 7/2017 | Burns et al. |
| 10,000,225 B2 | 6/2018 | Burns et al. |
| 2002/0164917 A1 | 11/2002 | Keegan et al. |
| 2004/0075231 A1 | 4/2004 | Hou et al. |
| 2008/0194389 A1 | 8/2008 | Southerland |
| 2011/0018216 A1 | 1/2011 | Cheng |

* cited by examiner

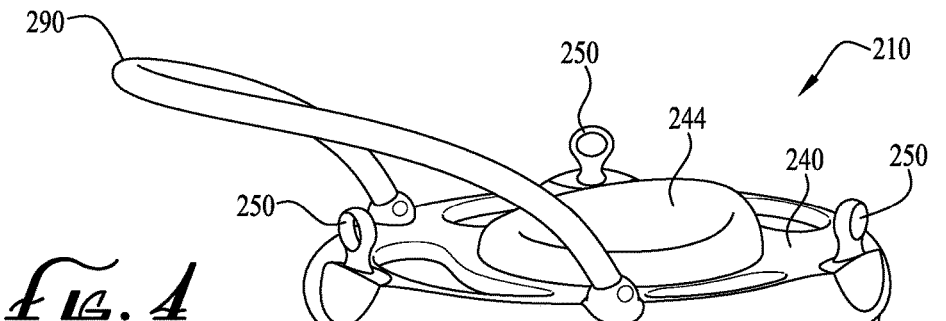
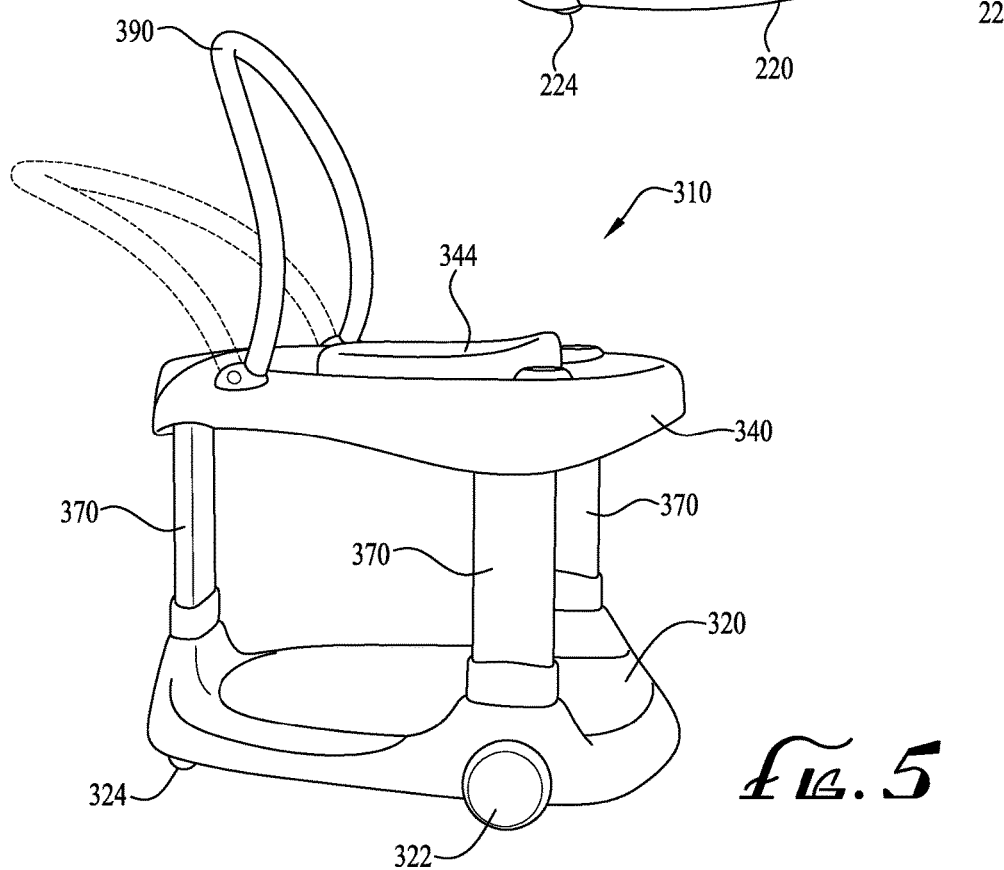

MOBILE CHILD SUPPORT DEVICE

CROSS-REFERENCE TO RELATED APPLICATIONS

This application is a continuation of U.S. Non-Provisional patent application Ser. No. 15/623,582 filed Jun. 15, 2017, which is a continuation of U.S. Non-Provisional patent application Ser. No. 15/077,075 filed Mar. 22, 2016, which claims the benefit of U.S. Provisional Patent Application Ser. No. 62/141,106 filed Mar. 31, 2015 and U.S. Provisional Patent Application Ser. No. 62/152,845 filed Apr. 25, 2015, the entireties of which are hereby incorporated herein by reference for all purposes.

TECHNICAL FIELD

The present invention relates generally to the field of children's accessories, and more particularly to a mobile child support and entertainment device.

BACKGROUND

Many child support and entertainment devices such as child seats, booster seats, bouncers, jumpers and the like are configured to be set up and used in a fixed location. Stationary support and entertainment devices such as these have been found to be less than ideal for active modern lifestyles, where a parent or other caregiver may wish to move the child frequently from location to location.

Known jumper or bouncer child support and entertainment devices also commonly do not allow sufficient height adjustability, either for the height of a growing child positioned in the device, and/or for use by caregivers of different heights.

Accordingly, it can be seen that needs exist for improved child support and entertainment devices providing for greater mobility in use. Needs also exist for improved bouncer and jumper devices allowing for height adjustment. It is to the provision of improved child support and entertainment devices meeting these and other needs that the present invention is primarily directed.

SUMMARY

In example embodiments, the present invention provides improved child support and entertainment devices. In representative examples, the invention relates to a free-standing, mobile child support device. The support device can be for example a jumper, entertainer, high chair, rocker, bouncer, booster seat, or the like. Particular example embodiments of the support device include a support frame configured to rest on a support surface (e.g. a floor or the ground), a child seat supported above the support surface by the support frame, and one or more rolling devices, such as castors, to facilitate movement of the support device across the support surface.

In one aspect, the present invention relates to a mobile child support and entertainment device including a base panel having a plurality of roller elements for rolling support of the child support and entertainment device on a support surface. The device preferably also includes an upper support body having a seat opening generally centrally positioned in the upper support body, and a seat positioned in the seat opening for receiving a child. The device preferably also includes at least one support leg extending generally upward from the base panel and supporting the upper support body a distance above the base panel.

In another aspect, the invention relates to a mobile child support and entertainment device including a support frame comprising a base having at least three rolling supports for rolling support of the child support and entertainment device along a support surface. The device preferably also includes a plurality of generally upright support legs extending upwardly from the base. The device preferably also includes an upper seat support body supported a distance above the base by the plurality of generally upright support legs, the upper seat support body defining a seat opening in which a child-supporting seat is mounted, wherein the base prevents a child supported in the seat from contacting the support surface to move the child support and entertainment device. The device preferably also includes a handle for allowing a caregiver to move the child support and entertainment device along the support surface.

In still another aspect, the invention relates to a mobile child support and entertainment device including a lower base having a plurality of rolling support elements for rolling support of the child support and entertainment device along a support surface, the lower base having an upper surface for contact with feet of a child positioned in the child support and entertainment device and preventing the feet of the child from contacting the support surface to move the child support and entertainment device. The device preferably also includes an upper support platform having a seat rotationally mounted thereto for supporting the child positioned in the child support and entertainment device above the lower base. The device preferably also includes a plurality of support legs supporting the upper support platform a distance above the lower base. The device preferably also includes a push-pull handle for allowing a caregiver to roll the mobile child support and entertainment device along the support surface. The mobile child support and entertainment device preferably defines a maximum external widthwise dimension less than about 28 inches.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments of the invention are exemplary and explanatory of preferred embodiments of the invention, and are not restrictive of the invention, as claimed.

BRIEF DESCRIPTION OF THE DRAWINGS

FIG. 4 is a perspective view of a child support and entertainment device according to another example embodiment of the invention.

FIG. 5 is a perspective view of a child support and entertainment device according to another example embodiment of the invention, having a repositionable push-pull mobility handle and toy-bar entertainer support member.

DETAILED DESCRIPTION OF EXAMPLE EMBODIMENTS

Figure 1:
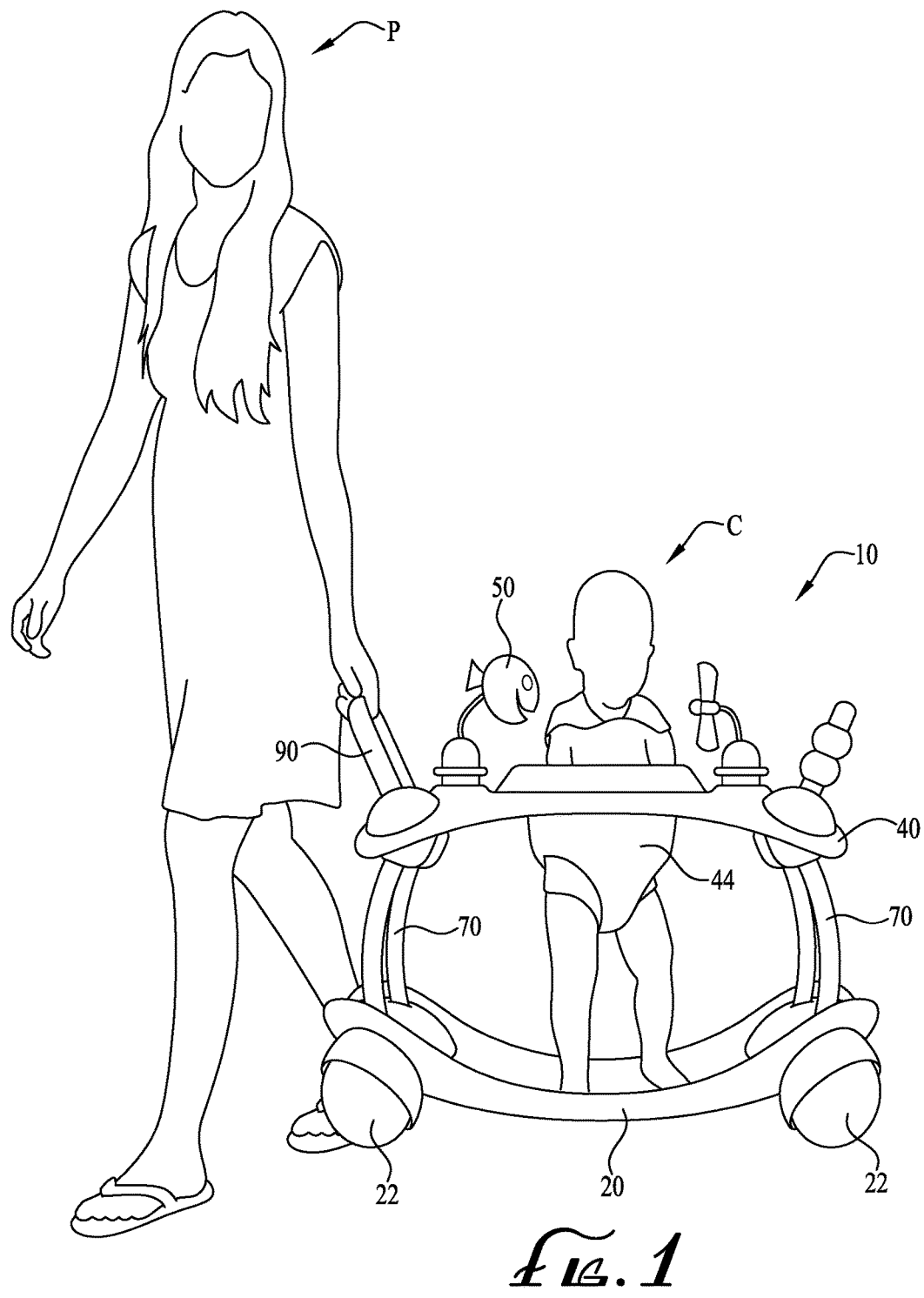
FIG. 1 shows a child support and entertainment device according to an example embodiment of the present invention, in use with a child positioned in the device and a caregiver moving the device between locations.

The present invention may be understood more readily by reference to the following detailed description of example embodiments of the invention taken in connection with the accompanying drawing figures, which form a part of this disclosure. It is to be understood that the invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-8 show child support and entertainment devices according to example embodiments of the invention. The child support and entertainment device can be for example a jumper, entertainer, high chair, rocker, bouncer, booster seat, or the like. In representative examples, the child support and entertainment device is a free-standing, mobile child support device that includes a receiver portion in which a child is positioned for use, and mobility features such as wheels or casters, a push and/or pull handle for a caregiver to move the device, and an external peripheral size and shape configured for ease of mobility and access, for example through standard residential doorways. In example embodiments, the mobility features are caregiver actuated and non-child-operable, such that a child positioned in the device cannot move the device, but a caregiver can readily move the device.

Figure 2:
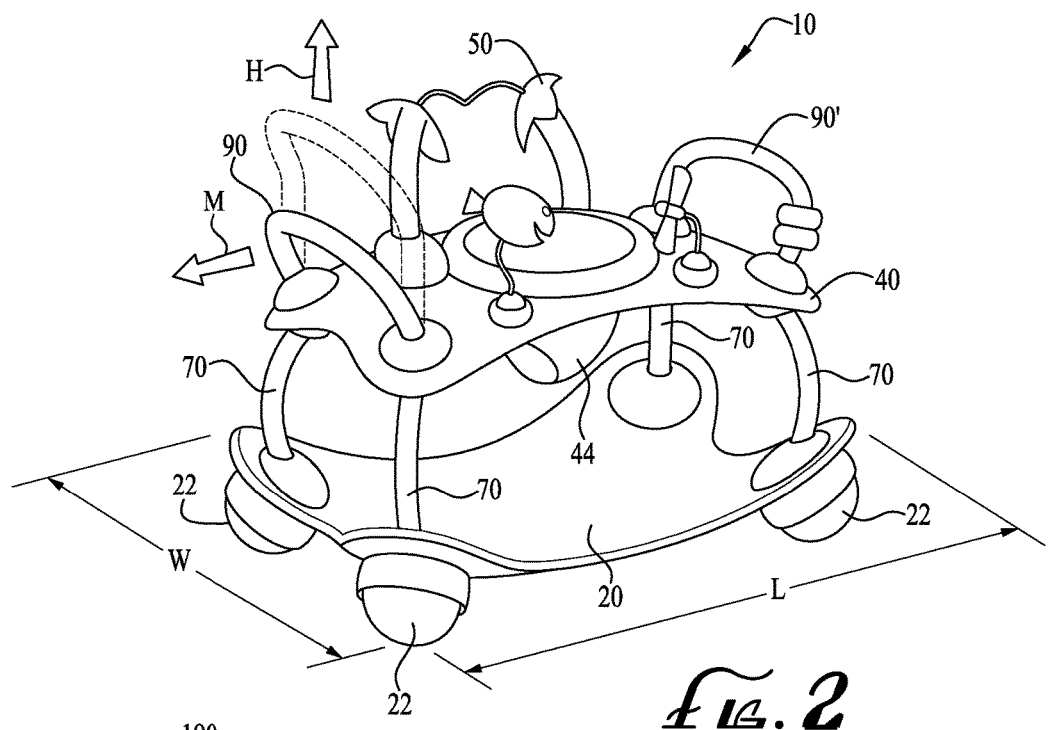
FIG. 2 is a perspective view of the child support and entertainment device of FIG. 1.

For example, as shown in FIGS. 1 and 2, a parent P or other adult caregiver can move an infant or child C positioned in a child support and entertainment device 10 from location to location in one or more directions such as for example a forward direction of motion M. In the depicted embodiment, the child support and entertainment device 10 comprises a support frame including a lower base or jump pad 20, an upper platform or support body 40, and one or more (four are shown) upright support legs 70 extending between the lower base 20 and the upper platform 40. A push and/or pull handle 90 extends from the upper platform 40 or other portion of the device 10, to allow the caregiver P to grasp and move the device.

The base 20 further comprises one or more wheels, casters or other rollers 22 for ease of mobility of the device 10. In the depicted embodiment, four roller-ball or ball-and-socket rollers are provided. In alternate embodiments, one, two, three or more than four rollers can be provided, and the rollers can take the form of wheels, casters or other rolling elements in addition to or in place of one or more of the roller-ball rollers 22. The rollers 22 allow rolling movement of the device 10 in at least one direction, and optionally in multiple directions. For example, swiveling casters or roller-ball rollers 22 can allow rolling of the device in any direction on the floor or other support surface, for example forward, backward, side-to-side, diagonally and/or along a curved path of travel. The rollers 22 are optionally positioned and/or configured to allow for a zero turning radius turn or otherwise allow for very tight maneuvering in confined spaces. One or more of the rollers 22 is/are optionally selectively locking rollers to allow the caregiver to lock the device 10 in position, and/or the device incorporates a brake mechanism to prevent unintended movement. The rollers 22 and support frame preferably provide sufficient structural rigidity and support to allow the device 10 to roll over smooth or uneven support surfaces with the child and any additional accessories positioned in or on the device, for example providing rolling support for a load weight of at least about 20 lbs (about 9 kg) or more.

In the depicted embodiment, the base 20 is generally rectangular, having a widthwise dimension W and a lengthwise dimension L. In example embodiments, the widthwise dimension W is smaller than the lengthwise dimension L. In alternate embodiments, the lengthwise dimension L is smaller than the widthwise dimension W. At least one of the widthwise dimension W and the lengthwise dimension L is preferably less than about 28" (about 71 cm), for example about 25" (about 63.5 cm) to allow for ease of maneuvering the device 10 through a standard residential doorway. In alternate embodiments, the widthwise dimension W and/or the lengthwise dimension L can be larger or smaller, depending on the particular intended application. The base 20 preferably comprises a substantially continuous panel having an upper surface for contact with the feet of a child positioned in the seat of the device, without openings large enough for a child's feet to pass through, to prevent pinch points or potential injury to a child positioned in the device 10, and to prevent a child positioned in the device from reaching the floor and moving the device (i.e., the device is not able to be self-propelled by the child, but can easily be moved by a caregiver). The base 20 preferably provides sufficient structural support and rigidity to support the weight of a child positioned in the device 10, for example at least about 20 lbs (about 9 kg) or more. The base 20 may be slightly concave as depicted in FIGS. 1 and 2, sloping downward from its outer periphery toward its center; or alternatively can be generally planar, convex, or irregularly configured.

The upper platform or support body 40 comprises a panel having a size and shape generally corresponding to that of the lower base 20 or is slightly smaller than the lower base, and is supported a distance above the lower base by the support legs 70. In the depicted example embodiment, the support legs 70 are arranged at each corner of the device 10, and extend between lower ends attached to the lower base 20 and upper ends attached to the upper support platform 40. The support legs 70 can be outwardly bowed or otherwise curved as depicted, or alternatively can be straight. The support legs optionally taper slightly inwardly relative to the vertical, or alternatively are generally vertically aligned. The support legs 70 can comprise tubular members, bars, panels, posts, walls, or other structural configurations. The support legs 70 are optionally extensible such as by provision of telescoping sleeve portions, to provide height adjustment of the upper platform 40 relative to the base 20. The example embodiment depicted in FIGS. 1 and 2 includes four support legs at corners of a generally rectangular device 10, but in alternate embodiments, the device can be generally circular, triangular, oval, polygonal, square or otherwise configured, and can comprise one, two, three, or more than four support legs for supporting an upper support platform a distance above a lower base 20. The upper support platform 40 preferably provides sufficient structural support and rigidity to support the weight of a child positioned in the device 10, for example at least about 20 lbs (about 9 kg) or more. The upper support platform 40 may be slightly convex as depicted in FIGS. 1 and 2, sloping downward from its center toward its outer periphery, for example generally mirroring the concavity of the lower base 20; or alternatively can be generally planar, concave, or irregularly configured.

The upper support platform 40 defines a seat opening located generally in the center of the platform, within which a seat 44 is mounted for receiving a child C positioned therein. The seat 44 is optionally mounted rotationally to the upper support platform 40, such that a child positioned therein can rotate 360° about relative to the upper support platform for interaction with entertainment features of the device 10 or persons or objects around the device. In example embodiments, the seat 44 comprises a fabric or soft-goods saddle or seat, having a pair of leg openings and a crotch support suspended below the upper support platform 40 and positioned a distance above the lower base 20, and optionally comprising a backrest portion extending above the upper support platform. One or more entertainment or accessory features 50, such as a rattle, teether, toy, mobile, character, cup-holder, mirror, light, containment tray, etc., are optionally attached to the upper support platform for interactive entertainment by the child C positioned in the device. In further example embodiments, electronic interactive features such as for example, a display screen, a computer tablet, a mobile phone, speakers, music player, sound generating devices, electronic game system, etc. can be removably or permanently mounted to the device 10.

One or more push-pull handles 90 are preferably provided at front and/or rear ends of the device 10, or alternatively along sides or other portions of the device. In the depicted embodiment, a front handle 90 is provided at the front end of the device 10, and a rear handle 90' is provided at the opposite rear end of the device. The handle 90 can be fixedly mounted to the device, or optionally can be movably mounted to extend, pivot or otherwise move relative to the support frame of the device. For example, in the embodiment depicted in FIGS. 1 and 2, the handle 90 can extend and retract for height adjustment as indicated by direction arrow H, to fit the preference of a parent or caregiver P desiring to move the device 10. In example forms, the handle 90 comprises a generally U-shaped member having a crossbar grip extending between connection arms on either side, or alternatively may comprises a T-shaped or L-shaped handle, a straight bar or grip, a loop or length of rope, or other flexible or rigid member.

Figure 3:
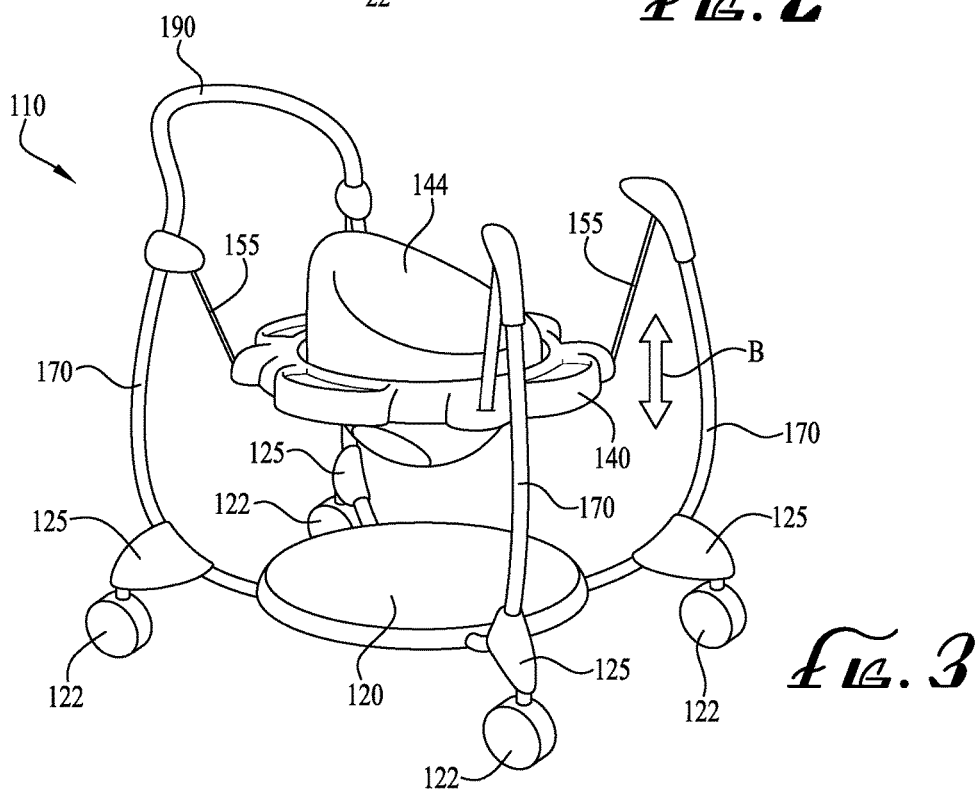
FIG. 3 is a perspective view of a child support and entertainment device according to another example embodiment of the invention.

FIG. 3 shows an alternate embodiment of a mobile child support and entertainment device 110. Device 110 similarly comprises a support frame including a lower base or jump pad 120, an upper platform or support body 140 with a seat 144 mounted therein, and four upright support legs 170 extending upwardly from the lower base 120. A push and/or pull handle 190 extends between upper ends of two of the support legs 170 of the device 10, to allow the caregiver to grasp and move the device. Rollers 122 such as wheels, casters or roller-balls are preferably provided at base portions of the legs 170 to allow the device 110 to roll along the floor, ground or other support surface for mobility. The legs 170 of the support frame optionally comprise upright portions 125 of a pair of U-shaped frame members attached or intersecting along a lower portion of the base 120. The upper support platform 140 of device 110 is supported by flexible members 155 extending between the support legs 170 and corners of the support platform 140, allowing swinging, bouncing or other range of movement of the platform relative to the base 120. In example embodiments, the flexible members 155 comprise elastically resilient extensible elements such as for example bungee cords, rubber tubes or strips, springs, elastic bands or straps, or other elastic members, to allow the seat platform 140 and the child disposed within the seat 144 to oscillate, bounce, or otherwise move (direction arrow B) relative to the base 120 of the support frame when a vertical force is imparted on the seat platform 140, for example by a child positioned in the seat 144 pushing against the base or jumping pad 120. The flexible members 155 may also incorporate a non-elastic attachment portion affixed to the ends thereof to facilitate coupling with the support frame and/or seat platform. In alternate embodiments, the flexible members can be rope or other non-elastic flexible members, to provide a swinging or swaying motion. The upper platform 140 also provides a tray, optionally having one or more containment recesses, for feeding or providing a play surface for the child. The elevation or height of the upper support platform 140 relative to the base 120 or floor is optionally adjustable, for example by adjusting the length of the flexible members 155 shorter or longer, moving the point of connection of the flexible members up or down along the support legs 170, extending (lengthening) or retracting (shortening) the support legs up or down, and/or by other height adjustment mechanism. The base or jumping pad 120 preferably prevents the feet of a child positioned in the seat 144 from contacting the floor to prevent self-propulsion by the child. The base or jump pad 120 can be permanently affixed to the frame, or alternatively can be removable to allow the child occupant's feet to touch the support surface if/when desired by a caregiver and appropriate in view of safety and regulatory considerations.

FIG. 4 shows another example embodiment of a mobile child support and entertainment device 210. Device 210 comprises a support frame including a lower base or jump pad 220, an upper platform or support body 240 with a seat 244 mounted therein, and three upright support legs 270 extending between the lower base 220 and the upper platform 240. A push and/or pull handle 290 extends from the upper platform 240 to allow the caregiver to grasp and move the device. The handle 290 is optionally hingedly connected to the upper platform 240 to allow for height adjustment to suit a user, and/or to alternatively position the handle for use as a toy-bar or canopy support over the seat 244. In alternate embodiments, the handle 290 can be removed and interchangeably attached in a first position for use as a push-pull handle, and in a second position for use as a toy bar or canopy support. The upper platform 240 optionally includes one or more loop links 250 for attachment of toys or accessories to the device 210. In the depicted embodiment, three loop links 250 are provided, one generally over each of the support legs 270. The base 220 and the upper platform 240 have a non-symmetric directional shape, being wider in the back and narrower in the front, for example defining a rounded triangular peripheral profile, for improved maneuverability. A pair of larger wheels 222 are mounted to the base 220 at or near the back of the device, and a pair of smaller casters 224 are pivotally mounted to the base at or near the front of the device. In example embodiments, an extensible coupling or joint incorporating a compression spring or other resilient member can be provided between the upper platform 240 and one or more of the support legs 270, allowing the upper platform to bounce relative to the base 220. Alternatively or additionally, the support legs 270 are optionally extensible such as by provision of telescoping sleeve portions, to provide height adjustment of the upper platform 240 relative to the base 220.

FIG. 5 shows another example embodiment of a mobile child support and entertainment device 310. Device 310 similarly comprises a support frame including a lower base or jump pad 320, an upper platform or support body 340 with a seat 344 mounted therein, and three upright support legs 370 extending between the lower base 320 and the upper platform 340. A push and/or pull handle 390 extends from a front end of the upper platform 340 to allow the caregiver to grasp and move the device. The handle 390 is hingedly connected to the upper platform 340 to allow for height adjustment to suit a user in a first or handle configuration (shown in broken lines), and/or to alternatively position the handle in a second or toy-bar configuration over the seat 344 (shown in solid lines). The base 320 and upper platform 340 are wider at the rear end and narrower at the front end of the device 310, to provide for improved maneuverability when the device is pulled forward in the direction of the front end. A pair of larger wheels 322 are mounted to the base 320 at or near the rear end of the device, and a single smaller caster 324 is pivotally mounted to the base at or near the front end of the device, to provide a stable three-point rolling contact support with the floor or other support surface, and to enable maneuverability with a zero turning radius or very tight turning radius.

Figure 6:
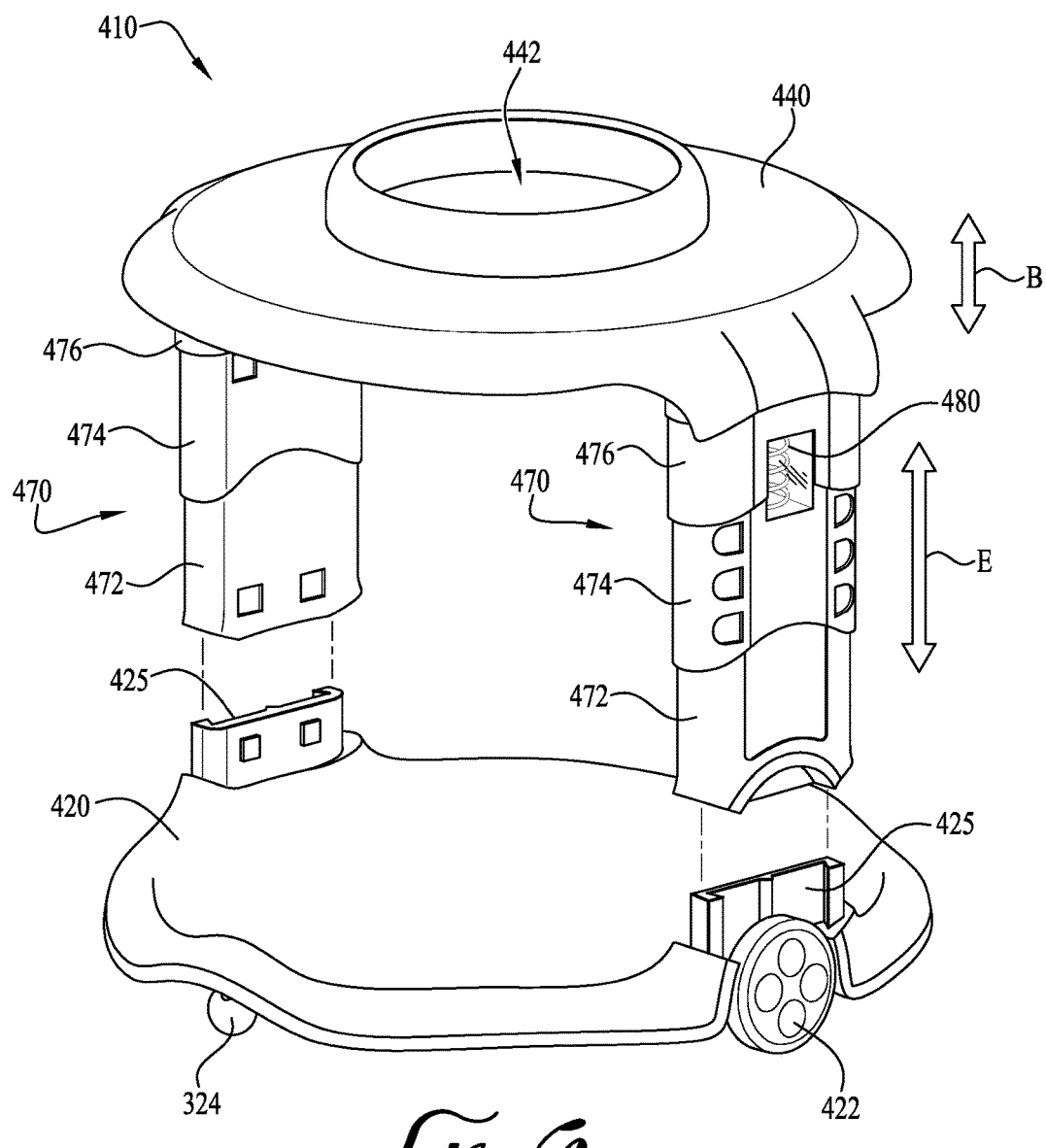
FIG. 6 is an assembly view of a child support and entertainment device having bounce and elevation height adjustability, according to another example embodiment of the invention.

FIG. 6 shows an assembly view of another example embodiment of a mobile child support and entertainment device 410. Device 410 comprises a support frame including a lower base or jump pad 420, an upper platform or support body 440 with central opening 442 for mounting a seat therein, and two upright support legs 470 extending between the lower base 420 and the upper platform 440. A pair of larger wheels 422 are mounted to medial portions of the base 420 generally beneath the support legs 470, and smaller casters 424 are pivotally mounted to the base at or near the front and rear ends of the device, allowing the device to roll forward and backward and to rotationally swivel about on the floor or other support surface. The base includes a pair of mounting flanges 425 extending upwardly at opposed medial portions, which are engaged within corresponding receivers of the support legs 470 to attach the support legs to the base. The support legs 470 comprise first (lower) and second (middle) telescoping sleeve sections 472, 474, for elevational height adjustment (direction arrow E) of the upper platform 440 relative to the base 420. The middle sections 474 define a spaced array of openings into which a spring biased locking tab of the lower section 472 is selectively positioned to adjust the height. A third (upper) telescoping sleeve section 476 is positioned between the middle telescoping sleeve section 474 and the upper platform 440. Compression springs 480 are engaged between the base 420 and the upper platform 440 on one or both sides of the device 410, for example between the middle and upper telescoping sleeve sections 474, 476, and the middle telescoping sleeve section slides within the upper telescoping sleeve section (or vice versa) allowing the upper platform to bounce relative to the base (direction arrow B). Optionally, the support legs 470 extend upwardly through and above the upper platform 440, to provide additional clearance and range of motion of the bouncing action of the device 410. A window or cutout is optionally provided in the middle and/or upper telescoping sleeve sections 474, 476 over the compression spring 480, to allow external visibility of the compression spring, and a clear cover can be provided over the window or cutout to prevent pinch-points.

Figure 7:
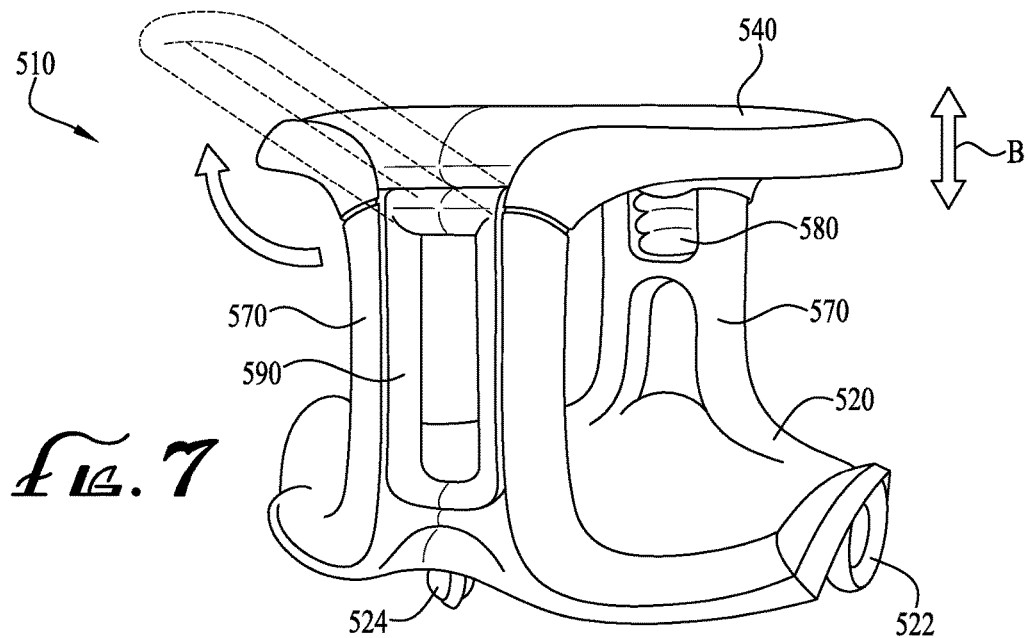
FIG. 7 is a perspective view of a child support and entertainment device according to another example embodiment of the invention.

FIG. 7 similarly shows another example embodiment of a mobile child support and entertainment device 510. Device 510 comprises a support frame including a lower base or jump pad 520, an upper platform or support body 540 for mounting a seat to, and two upright support legs 570 extending between the lower base 520 and the upper platform 540. A pair of larger wheels 522 are mounted to medial portions of the base 520, and smaller casters 524 are pivotally mounted to the base at or near the front and rear ends of the device generally beneath the support legs 570. A push-pull handle 590 is hingedly mounted to the front end of the device 510 to pivot between a retracted or stowed position (solid lines) and an extended or use position (broken lines). The upper platform 540 is pivotally connected to one of the support legs 570 at the front end of the device 510, for example coaxially with the rotational coupling of the handle 590, and slidably connected to the other support leg 570 at the rear end of the device with a compression spring 580 engaged therebetween, allowing the upper platform 540 to bounce pivotally (direction arrow B) relative to the base 520. A cover or shield may be provided over the compression spring 580 to prevent pinch points.

Figure 8:
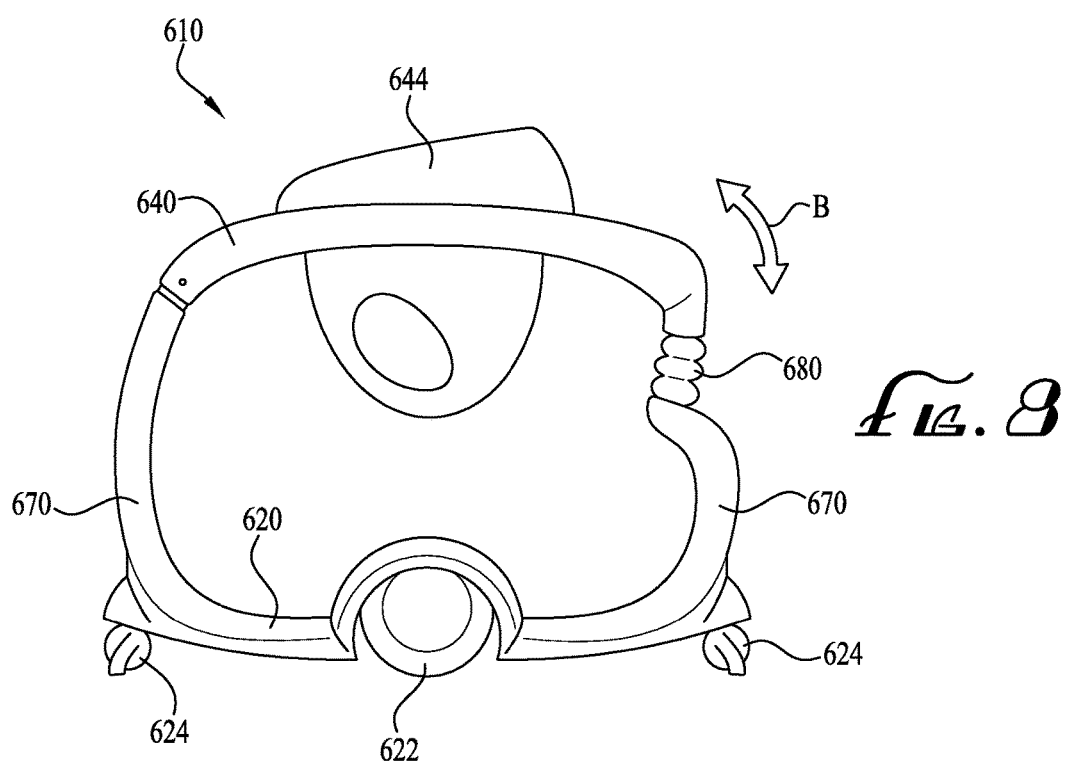
FIG. 8 is a side view of a child support and entertainment device according to another example embodiment of the invention.

FIG. 8 similarly shows another example embodiment of a mobile child support and entertainment device 610. Device 610 comprises a support frame including a lower base or jump pad 620, an upper platform or support body 640 having a seat 644 mounted thereto, and two upright support legs 670 extending between the lower base 620 and the upper platform 640. A pair of larger wheels 622 are mounted to medial portions of the base 520, and smaller casters 624 are pivotally mounted to the base at or near the front and rear ends of the device generally beneath the support legs 670. In alternate embodiments, the positions of the larger wheels and the casters can be reversed. A push-pull handle may optionally be mounted to the front and/or rear ends of the device 610 to allow a caregiver to move the device. The upper platform 640 is pivotally connected to one of the support legs 670 at the front end of the device 610, and translationally mounted to the other support leg 670 at the rear end of the device with a compression spring 680 engaged therebetween, allowing the upper platform 640 to bounce pivotally (direction arrow B) relative to the base 620. A cover or shield may be provided over the compression spring 680 to prevent pinch points.

In use, a child is positioned in the seat of a child support and entertainment device according to any of the disclosed embodiments. The child may jump or bounce by pushing off against the base or jump pad of the device. Compression springs, elastic members or other resilient elements may enhance the bouncing or oscillation of the seat and support platform as the child jumps or bounces. The child may play and interact with various entertainment accessories provided on the support platform. The height or elevation of the support platform can optionally be raised and lowered to selectively fit the device to the size of the child. A caregiver can easily move and maneuver the device from location to location by releasing (if locked or brakes engaged) the wheels, casters and/or other roller elements and rolling the device along the floor, ground or other support surface. In embodiments incorporating a handle, the caregiver can move the device by pushing or pulling the handle, and optionally can adjust the height of the handle to selectively fit to the caregiver's preference. In example embodiments, the device is readily maneuvered through standard residential doorways, from location to location on both smooth and irregular support surfaces, and allows turning in a tight or zero turning radius.

While the invention has been described with reference to preferred and example embodiments, it will be understood by those skilled in the art that a variety of modifications, additions and deletions are within the scope of the invention, as defined by the following claims.

What is claimed is:

1. A mobile child support and entertainment device comprising:
    a base comprising a plurality of roller elements providing rolling movement of the mobile child support and entertainment device along a support surface, and a substantially continuous panel configured to prevent feet of a child positioned in the mobile child support and entertainment device from reaching the support surface;
    an upper support body supported at a height above the base, the upper support body comprising a seat positioned above the panel of the base for receiving the child positioned in the mobile child support and entertainment device; and
    a handle coupled to the upper support body, the handle being configured for a first mode of use as a handle for a user to push or pull the mobile child support and entertainment device, and wherein the handle is also configured for a second mode of use as a toy bar in an elevated position over the seat and accessible by a child positioned in the seat of the mobile child support and entertainment device.

2. The mobile child support and entertainment device of claim 1, wherein the height at which the upper support body is supported above the base enables the feet of the child positioned in the mobile child support and entertainment device to push on the panel of the base.

3. The mobile child support and entertainment device of claim 1, wherein the roller elements are configured to allow rolling movement of the mobile child support and entertainment device along the support surface in a direction of motion, and wherein the handle extends from the mobile child support and entertainment device in alignment with the direction of motion.

4. The mobile child support and entertainment device of claim 3, wherein the base has a maximum widthwise dimension transverse to the direction of motion of less than about 28".

5. The mobile child support and entertainment device of claim 1, wherein the upper support body is supported above the base by a plurality of support members.

6. The mobile child support and entertainment device of claim 5, wherein at least one of the plurality of support members is extensible, to allow adjustment of the height at which the upper support body is supported above the base.

7. The mobile child support and entertainment device of claim 1, wherein the seat is rotationally mounted within the upper support body.

8. The mobile child support and entertainment device of claim 1, wherein the upper support body comprises a tray positioned at least partially around the seat.

9. The mobile child support and entertainment device of claim 8, further comprising at least one entertainment accessory attached to the tray.

10. A mobile child support and entertainment device comprising:
    a base comprising a panel with a plurality of roller elements mounted thereto; and
    a seat supported above the base for receiving a child, wherein the seat is positioned directly over the panel of the base such that the child is able to push their feet against the panel but the panel prevents the child from self-propelling the mobile child support and entertainment device along an underlying support surface;
    a play area comprising entertainment accessories positioned around the seat; and
    a handle coupled to the play area, the handle having a grip extending between connection arms on either side, wherein the connection arms are coupled to the play area and the grip is located above the play area, wherein the handle is suitable for a first mode of use in pushing or pulling by a caregiver to move the mobile child support and entertainment device, and for a second mode of use as a toy bar in a position elevated above and accessible by a child in the seat.

11. The mobile child support and entertainment device of claim 10, wherein the handle is pivotally repositionable between a first position extending away from the seat for use in pushing or pulling by the caregiver to move the mobile child support and entertainment device, and a second position for the second mode of use elevated above and accessible by the child in the seat.

12. The mobile child support and entertainment device of claim 10, wherein the seat is rotationally mounted within an upper support body, and wherein the play area substantially surrounds the seat.

13. The mobile child support and entertainment device of claim 10, further comprising at least one elastically resilient element providing bouncing of the seat relative to the base.

14. The mobile child support and entertainment device of claim 10, defining a maximum widthwise dimension of less than about 28".

15. The mobile child support and entertainment device of claim 10, wherein the plurality of roller elements comprise a pair of larger rolling wheels and at least one caster rotationally mounted to the base.

16. A mobile child support and entertainment device comprising:
    a base comprising a panel and a plurality of roller elements mounted to the panel, the roller elements allowing the mobile child support and entertainment device to be rolled along an underlying support surface;
    a plurality of support members extending from the base;
    an upper support body supported above the base by the plurality of support members, a seat for receiving a child therein, wherein the seat is rotationally mounted within the upper support body, a tray substantially surrounding the seat and defining a play area around the seat, and a plurality of entertainment features positioned in the play area at different positions around the seat; and a handle repositionably coupled to the upper support body, the handle having a grip extending between connection arms on either side, wherein the connection arms are coupled to the play area, wherein the handle is movable between a first position for use as a push-pull handle by a caregiver, and a second position for use as a toy bar wherein the grip of the handle is elevated over a child positioned in the seat.

17. The mobile child support and entertainment device of claim 16, wherein at least one of the plurality of support members is extensible, to allow adjustment of a height at which the upper support body is supported above the base.

18. The mobile child support and entertainment device of claim 16, further comprising at least one elastically resilient element providing bouncing of the upper support body relative to the base.

19. The mobile child support and entertainment device of claim 16, wherein the plurality of roller elements comprise a pair of larger rolling wheels and at least one caster rotationally mounted to the base.

20. A mobile child support and entertainment device comprising:

a base comprising a substantially continuous panel and a plurality of roller elements mounted to the panel, the roller elements allowing the mobile child support and entertainment device to be rolled along an underlying support surface;

a plurality of support members extending from the base;

an upper support body supported above the base by the plurality of support members, a seat rotationally mounted within the upper support body, a tray substantially surrounding the seat and defining a play area around the seat, and a plurality of entertainment features positioned on the tray at different positions around the seat; and a handle coupled to the play area, the handle being suitable for both pushing or pulling by a caregiver to move the mobile child support and entertainment device, and also for use as a toy bar in a position elevated above a child in the seat.

* * * * *